United States Patent
Mishra et al.

(10) Patent No.: US 12,500,446 B1
(45) Date of Patent: Dec. 16, 2025

(54) WIRELESS POWER TRANSFER IN COMMUNICATIONS

(71) Applicant: Nokia Technologies Oy, Espoo (FI)

(72) Inventors: Shashwat Mishra, Massy (FR); Muhammad Majid Butt, Naperville, IL (US); Sahan Damith Liyanaarachchi, Tampere (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 19/236,588

(22) Filed: Jun. 12, 2025

(30) Foreign Application Priority Data

Jun. 13, 2024 (FI) ...................................... 20245757

(51) Int. Cl.
- H02J 50/00 (2016.01)
- H02J 50/20 (2016.01)
- H02J 50/80 (2016.01)

(52) U.S. Cl.
CPC ............ *H02J 50/001* (2020.01); *H02J 50/20* (2016.02); *H02J 50/80* (2016.02)

(58) Field of Classification Search
CPC ............ H02J 50/00; H02J 50/80; H02J 50/20
See application file for complete search history.

(56) References Cited

U.S. PATENT DOCUMENTS

| | | | |
|---|---|---|---|
| 9,271,242 B2* | 2/2016 | Vannithamby | H04W 72/23 |
| 9,680,327 B2* | 6/2017 | Scheb | H04W 52/0251 |
| 2007/0109121 A1* | 5/2007 | Cohen | H04Q 9/00 340/693.1 |
| 2014/0351181 A1* | 11/2014 | Canoy | G06N 20/00 706/12 |
| 2019/0363746 A1* | 11/2019 | Zalewski | H04W 4/70 |
| 2022/0352751 A1* | 11/2022 | Elshafie | H02J 50/23 |
| 2024/0072572 A1* | 2/2024 | Butt | H02J 50/05 |
| 2024/0160866 A1* | 5/2024 | He | H02J 50/001 |

FOREIGN PATENT DOCUMENTS

| | | | |
|---|---|---|---|
| WO | 2024/055285 A1 | 3/2024 | |
| WO | WO-2024192662 A1 * | 9/2024 | H04W 8/24 |

OTHER PUBLICATIONS

"3rd Generation Partnership Project; Technical Specification Group Services and System Aspects; Study on Ambient power-enabled Internet of Things (Release 19)", 3GPP TR 22.840, V2.2.0, Dec. 2023, 120 pages.

(Continued)

*Primary Examiner* — Vincent H Tran
(74) *Attorney, Agent, or Firm* — Nokia Technologies Oy

(57) ABSTRACT

Disclosed is a method comprising an apparatus instructing a set of ambient radiation powered devices to suspend transmissions other than harvested energy reporting during a training period. Upon at least a predefined number of the ambient radiation powered devices in the set agreeing to transmit harvested energy reporting during the training period with a predefined reporting periodicity configured by the apparatus, the apparatus is caused to receive the harvested energy reporting from at least one ambient radiation powered device in the set, with the predefined reporting periodicity configured by the apparatus.

12 Claims, 9 Drawing Sheets

(56) References Cited

OTHER PUBLICATIONS

"3rd Generation Partnership Project; Technical Specification Group Services and System Aspects; Study on Interconnect of SNPN; (Release 19)", 3GPP TR 22.848, V0.2.0, Aug. 2023, pp. 1-19.

"New SID: Study on Ambient IoT", 3GPP TSG RAN#97e, RP-222685, Agenda: 9.1, Huawei, Sep. 12-16, 2022, 5 pages.

"3rd Generation Partnership Project; Technical Specification Group Radio Access Network; Study Ambient IoT (Internet of Things) in RAN (Release 18)", 3GPP TR 38.848, V0.1.0, Mar. 2023, pp. 1-17.

United Kingdom Application No. 2408446.9, "Wireless Power Transfer in Communications", filed on Jun. 10, 2024, pp. 1-47.

"IEEE 802.11", Wikipedia, Retrieved on Jun. 9, 2025, webpage available at : https://en.wikipedia.org/wiki/IEEE_802.11.

"IEEE 802.15", Wikipedia, Retrieved on Jun. 9, 2025, webpage available at : https://en.wikipedia.org/wiki/IEEE_802.15.

Office Action received for corresponding Finnish Patent Application No. 20245757, dated Mar. 11, 2025, 8 pages.

Office Action received for corresponding Finnish Patent Application No. 20245757, dated Apr. 30, 2025, 5 pages.

\* cited by examiner

WIRELESS POWER TRANSFER IN COMMUNICATIONS

FIELD

The following example embodiments relate to wireless communication and to wireless power transfer.

BACKGROUND

Wireless energy harvesting enables harvesting of energy from radio frequency signals. Radio frequency signals may carry both information and energy. Wireless energy harvesting or wireless power transfer may be used by wireless devices to harvest small amounts of energy from the radio frequency signals. The harvested energy may then be used to power the devices or charge batteries of the devices.

SUMMARY

The scope of protection sought for various example embodiments is set out by the independent claims. The example embodiments and features, if any, described in this specification that do not fall under the scope of the independent claims are to be interpreted as examples useful for understanding various embodiments.

According to an aspect, there is provided an apparatus comprising at least one processor, and at least one memory storing instructions that, when executed by the at least one processor, cause the apparatus at least to:
  initiate a training period by instructing a set of ambient radiation powered devices to suspend transmissions other than harvested ambient radiation energy report during the training period; and
  upon at least a predefined number of the ambient radiation powered devices in the set agreeing to transmit the harvested ambient radiation energy report during the training period with a predefined reporting periodicity configured by the apparatus, receive the harvested ambient radiation energy report from at least one ambient radiation powered device in the set with the predefined reporting periodicity configured by the apparatus.

According to another aspect, there is provided an apparatus comprising: means for
  initiating a training period by instructing a set of ambient radiation powered devices to suspend transmissions other than harvested ambient radiation energy report during the training period; and
  upon at least a predefined number of the ambient radiation powered devices in the set agreeing to transmit the harvested ambient radiation energy report during the training period with a predefined reporting periodicity configured by the apparatus, receiving the harvested ambient radiation energy report from at least one ambient radiation powered device in the set with the predefined reporting periodicity configured by the apparatus.

According to another aspect, there is provided a method comprising, by a network apparatus:
  initiating a training period by instructing a set of ambient radiation powered devices to suspend transmissions other than harvested ambient radiation energy report during the training period; and
  upon at least a predefined number of the ambient radiation powered devices in the set agreeing to transmit the harvested ambient radiation energy report during the training period with a predefined reporting periodicity configured by the apparatus, receiving the harvested ambient radiation energy report from at least one ambient radiation powered device in the set with the predefined reporting periodicity configured by the apparatus.

According to another aspect, there is provided a computer program comprising instructions which, when executed by an apparatus, cause the apparatus to perform at least the following:
  initiate a training period by instructing a set of ambient radiation powered devices to suspend transmissions other than harvested ambient radiation energy report during the training period; and
  upon at least a predefined number of the ambient radiation powered devices in the set agreeing to transmit the harvested ambient radiation energy report during the training period with a predefined reporting periodicity configured by the apparatus, receive the harvested ambient radiation energy report from at least one ambient radiation powered device in the set with the predefined reporting periodicity configured by the apparatus.

According to another aspect, there is provided a computer readable medium comprising program instructions which, when executed by an apparatus, cause the apparatus to perform at least the following:
  initiate a training period by instructing a set of ambient radiation powered devices to suspend transmissions other than harvested ambient radiation energy report during the training period; and
  upon at least a predefined number of the ambient radiation powered devices in the set agreeing to transmit the harvested ambient radiation energy report during the training period with a predefined reporting periodicity configured by the apparatus, receive the harvested ambient radiation energy report from at least one ambient radiation powered device in the set with the predefined reporting periodicity configured by the apparatus.

According to another aspect, there is provided a non-transitory computer readable medium comprising program instructions which, when executed by an apparatus, cause the apparatus to perform at least the following:
  initiate a training period by instructing a set of ambient radiation powered devices to suspend transmissions other than harvested ambient radiation energy report during the training period; and
  upon at least a predefined number of the ambient radiation powered devices in the set agreeing to transmit the harvested ambient radiation energy report during the training period with a predefined reporting periodicity configured by the apparatus, receive the harvested ambient radiation energy report from at least one ambient radiation powered device in the set with the predefined reporting periodicity configured by the apparatus.

According to another aspect, there is provided a device comprising at least one processor, and at least one memory storing instructions that, when executed by the at least one processor, cause the device at least to:
  receive, from a network apparatus, a transmission instructing the device to suspend transmissions other than harvested ambient radiation energy report during a training period; and
  agree or disagree to transmit, to the network apparatus, the harvested ambient radiation energy report during the training period with a predefined reporting periodicity configured by the network apparatus.

According to another aspect, there is provided a device comprising: means for
- receiving, from a network apparatus, a transmission instructing the device to suspend transmissions other than harvested ambient radiation energy report during a training period; and
- agreeing or disagreeing to transmit, to the network apparatus, the harvested ambient radiation energy report during the training period with a predefined reporting periodicity configured by the network apparatus.

According to another aspect, there is provided a method comprising, by a device:
- receiving, from a network apparatus, a transmission instructing the device to suspend transmissions other than harvested ambient radiation energy report during a training period; and
- agreeing or disagreeing to transmit, to the network apparatus, the harvested ambient radiation energy report during the training period with a predefined reporting periodicity configured by the network apparatus.

According to another aspect, there is provided a computer program comprising instructions which, when executed by a device, cause the device to perform at least the following:
- receive, from a network apparatus, a transmission instructing the device to suspend transmissions other than harvested ambient radiation energy report during a training period; and
- agree or disagree to transmit, to the network apparatus, the harvested ambient radiation energy report during the training period with a predefined reporting periodicity configured by the network apparatus.

According to another aspect, there is provided a computer readable medium comprising program instructions which, when executed by a device, cause the device to perform at least the following:
- receive, from a network apparatus, a transmission instructing the device to suspend transmissions other than harvested ambient radiation energy report during a training period; and
- agree or disagree to transmit, to the network apparatus, the harvested ambient radiation energy report during the training period with a predefined reporting periodicity configured by the network apparatus.

According to another aspect, there is provided a non-transitory computer readable medium comprising program instructions which, when executed by a device, cause the device to perform at least the following:
- receive, from a network apparatus, a transmission instructing the device to suspend transmissions other than harvested ambient radiation energy report during a training period; and
- agree or disagree to transmit, to the network apparatus, the harvested ambient radiation energy report during the training period with a predefined reporting periodicity configured by the network apparatus.

BRIEF DESCRIPTION OF THE DRAWINGS

In the following, various example embodiments will be described in greater detail with reference to the accompanying drawings, in which.

DETAILED DESCRIPTION

The following embodiments are exemplifying. Although the specification may refer to "an", "one", or "some" embodiment(s) in several locations of the text, this does not necessarily mean that each reference is made to the same embodiment(s), or that a particular feature only applies to a single embodiment. Single features of different embodiments may also be combined to provide other embodiments.

Some example embodiments described herein may be implemented in a wireless communication network comprising a radio access network based on one or more of the following radio access technologies (RATs): Global System for Mobile Communications (GSM) or any other second generation radio access technology, Universal Mobile Telecommunication System (UMTS, 3G) based on basic wideband-code division multiple access (W-CDMA), high-speed packet access (HSPA), Long Term Evolution (LTE), LTE-Advanced, fourth generation (4G), fifth generation (5G), 5G new radio (NR), 5G-Advanced (i.e., 3GPP NR Rel-18 and beyond), or sixth generation (6G). Some examples of radio access networks include the universal mobile telecommunications system (UMTS) radio access network (UTRAN), the Evolved Universal Terrestrial Radio Access network (E-UTRA), or the next generation radio access network (NG-RAN). The wireless communication network may further comprise a core network, and some example embodiments may also be applied to network functions of the core network.

It should be noted that the embodiments are not restricted to the wireless communication network given as an example, but a person skilled in the art may also apply the solution to other wireless communication networks or systems provided with necessary properties. For example, some example embodiments may also be applied to a communication system based on IEEE 802.11 specifications, or a communication system based on IEEE 802.15 specifications. IEEE is an abbreviation for the Institute of Electrical and Electronics Engineers.

Figure 1:
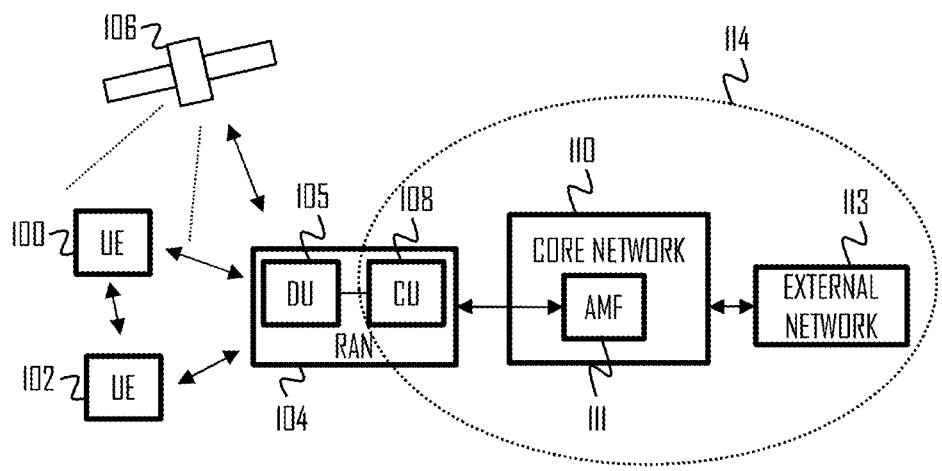
FIG. 1 illustrates an example of a wireless communication network.

FIG. 1 depicts an example of a simplified wireless communication network showing some physical and logical entities. The connections shown in FIG. 1 may be physical connections or logical connections. It is apparent to a person skilled in the art that the wireless communication network may also comprise other physical and logical entities than those shown in FIG. 1.

The example embodiments described herein are not, however, restricted to the wireless communication network given as an example but a person skilled in the art may apply the example embodiments described herein to other wireless communication networks provided with necessary properties.

The example wireless communication network shown in FIG. 1 includes a radio access network (RAN) and a core network 110.

FIG. 1 shows user equipment (UE) 100, 102 configured to be in a wireless connection on one or more communication channels in a radio cell with an access node 104 of a radio access network.

The access node 104 may comprise a computing device configured to control the radio resources of the access node 104 and to be in a wireless connection with one or more UEs 100, 102. The access node 104 may also be referred to as a base station, a base transceiver station (BTS), an access point, a cell site, a network node, a radio access network node, or a RAN node. The access node 104 may be, for example, an evolved NodeB (abbreviated as eNB or eNodeB), or a next generation evolved NodeB (abbreviated as ng-eNB), or a next generation NodeB (abbreviated as gNB or gNodeB), providing the radio cell. The access node 104 may include or be coupled to transceivers. From the transceivers of the access node 104, a connection may be provided to an antenna unit that establishes a bi-directional radio link to one or more UEs 100, 102. The antenna unit may comprise an antenna or antenna element, or a plurality of antennas or antenna elements.

The wireless connection (e.g., radio link) from a UE 100, 102 to the access node 104 may be called uplink (UL) or reverse link, and the wireless connection (e.g., radio link) from the access node 104 to the UE 100, 102 may be called downlink (DL) or forward link. A UE 100 may also communicate directly with another UE 102, and vice versa, via a wireless connection generally referred to as a sidelink (SL). It should be appreciated that the access node 104 or its functionalities may be implemented by using any node, host, server, access point or other entity suitable for providing such functionalities.

The radio access network may comprise more than one access node 104, in which case the access nodes may also be configured to communicate with one another over wired or wireless links. These links between access nodes may be used for sending and receiving control plane signaling and also for routing data from one access node to another access node.

The access node 104 may further be connected to a core network (CN) 110. The core network 110 may comprise an evolved packet core (EPC) network and/or a $5^{th}$ generation core network (5GC). The EPC may comprise network entities, such as a serving gateway (S-GW for routing and forwarding data packets), a packet data network gateway (P-GW) for providing connectivity of UEs to external packet data networks, and/or a mobility management entity (MME). The 5GC may comprise one or more network functions, such as at least one of: an access and mobility management function (AMF) 111, a user plane function (UPF), a location management function (LMF), and/or a session management function (SMF).

The core network 110 may also be able to communicate with one or more external networks 113, such as a public switched telephone network or the Internet, or utilize services provided by them. For example, in 5G wireless communication networks, the UPF of the core network 110 may be configured to communicate with an external data network via an N6 interface. In LTE wireless communication networks, the P-GW of the core network 110 may be configured to communicate with an external data network.

It should also be understood that the distribution of functions between core network operations and access node operations may differ in future wireless communication networks compared to that of the LTE or 5G, or even be non-existent.

The illustrated UE 100, 102 is one type of an apparatus to which resources on the air interface may be allocated and assigned. The UE 100, 102 may also be called a wireless communication device, a subscriber unit, a mobile station, a remote terminal, an access terminal, a user terminal, a terminal device, or a user device, just to mention but a few names. The UE 100, 102 may be a computing device operating with or without a subscriber identification module (SIM), including, but not limited to, the following types of computing devices: a mobile phone, a smartphone, a personal digital assistant (PDA), a handset, a computing device comprising a wireless modem (e.g., an alarm or measurement device, etc.), a laptop computer, a desktop computer, a tablet, a game console, a notebook, a multimedia device, a reduced capability (RedCap) device, a wearable device (e.g., a watch, earphones or eyeglasses) with radio parts, a sensor comprising a wireless modem, or a computing device comprising a wireless modem integrated in a vehicle.

It should be appreciated that the UE 100, 102 may also be a nearly exclusive uplink-only device, of which an example may be a camera or video camera loading images or video clips to a network. The UE 100, 102 may also be a device having capability to operate in an Internet of Things (IoT) network, which is a scenario in which objects may be provided with the ability to transfer data over a network without requiring human-to-human or human-to-computer interaction.

The wireless communication network may also be able to support the usage of cloud services. For example, at least part of core network operations may be carried out as a cloud service (this is depicted in FIG. 1 by "cloud" 114). The UE 100, 102 may also utilize the cloud 114. In some applications, the computation for a given UE may be carried out in the cloud 114 or in another UE.

The wireless communication network may also comprise a central control entity, such as a network management system (NMS), or the like. The NMS is a centralized suite of software and hardware used to monitor, control, and administer the network infrastructure. The NMS is responsible for a wide range of tasks such as fault management, configuration management, security management, performance management, and accounting management. The NMS enables network operators to efficiently manage and optimize network resources, ensuring that the network delivers high performance, reliability, and security.

5G enables using multiple-input and multiple-output (MIMO) antennas in the access node 104 and/or the UE 100, 102, many more base stations or access nodes than an LTE network (a so-called small cell concept), including macro sites operating in co-operation with smaller stations and employing a variety of radio technologies depending on service needs, use cases and/or spectrum available. 5G wireless communication networks may support a wide range of use cases and related applications including video streaming, augmented reality, different ways of data sharing and various forms of machine-type applications, such as (massive) machine-type communications (mMTC), including vehicular safety, different sensors and real-time control.

In 5G wireless communication networks, access nodes and/or UEs may have multiple radio interfaces, such as below 6 gigahertz (GHz), centimeter wave (cmWave) and millimeter wave (mmWave), and also being integrable with legacy radio access technologies, such as LTE. Integration with LTE may be implemented, for example, as a system, where macro coverage may be provided by LTE, and 5G radio interface access may come from small cells by aggregation to LTE. In other words, a 5G wireless communication network may support both inter-RAT operability (such as interoperability between LTE and 5G) and inter-RI operability (inter-radio interface operability, such as between below 6 GHz, cmWave, and mmWave).

5G wireless communication networks may also apply network slicing, in which multiple independent and dedicated virtual sub-networks (network instances) may be created within the same physical infrastructure to run services that have different requirements on latency, reliability, throughput and mobility.

In one embodiment, an access node 104 may comprise: a radio unit (RU) comprising a radio transceiver (TRX), i.e., a transmitter (Tx) and a receiver (Rx); one or more distributed units (DUs) 105 that may be used for the so-called Layer 1 (L1) processing and real-time Layer 2 (L2) processing; and a central unit (CU) 108 (also known as a centralized unit) that may be used for non-real-time L2 and Layer 3 (L3) processing. The CU 108 may be connected to the one or more DUs 105 for example via an F1 interface. Such an embodiment of the access node 104 may enable the centralization of CUs relative to the cell sites and DUs, whereas DUs may be more distributed and may even remain at cell sites. The CU and DU together may also be referred to as baseband or a baseband unit (BBU). The CU and DU may also be comprised in a radio access point (RAP).

The CU 108 may be a logical node hosting radio resource control (RRC), service data adaptation protocol (SDAP) and/or packet data convergence protocol (PDCP), of the NR protocol stack for an access node 104. The CU 108 may comprise a control plane (CU-CP), which may be a logical node hosting the RRC and the control plane part of the PDCP protocol of the NR protocol stack for the access node 104. The CU 108 may further comprise a user plane (CU-UP), which may be a logical node hosting the user plane part of the PDCP protocol and the SDAP protocol of the CU for the access node 104.

The DU 105 may be a logical node hosting radio link control (RLC), medium access control (MAC) and/or physical (PHY) layers of the NR protocol stack for the access node 104. The operations of the DU 105 may be at least partly controlled by the CU 108. It should also be understood that the distribution of functions between the DU 105 and the CU 108 may vary depending on the implementation.

Cloud computing systems may also be used to provide the CU 108 and/or DU 105. A CU provided by a cloud computing system may be referred to as a virtualized CU (vCU). In addition to the vCU, there may also be a virtualized DU (vDU) provided by a cloud computing system. Furthermore, there may also be a combination, where the DU may be implemented on so-called bare metal solutions, for example application-specific integrated circuit (ASIC) or customer-specific standard product (CSSP) system-on-a-chip (SoC).

Edge cloud may be brought into the radio access network by utilizing network function virtualization (NFV) and software defined networking (SDN). Using edge cloud may mean access node operations to be carried out, at least partly, in a computing system operationally coupled to a remote radio head (RRH) or a radio unit (RU) of an access node 104. It is also possible that access node operations may be performed on a distributed computing system or a cloud computing system located at the access node 104. Application of cloud RAN architecture enables RAN real-time functions being carried out at the radio access network (e.g., in a DU 105), and non-real-time functions being carried out in a centralized manner (e.g., in a CU 108).

5G (or new radio, NR) wireless communication networks may support multiple hierarchies, where multi-access edge computing (MEC) servers may be placed between the core network 110 and the access node 104. It should be appreciated that MEC may be applied in LTE wireless communication networks as well.

A 5G wireless communication network ("5G network") may also comprise a non-terrestrial communication network, such as a satellite communication network, to enhance or complement the coverage of the 5G radio access network. For example, satellite communication may support the transfer of data between the 5G radio access network and the core network 110, enabling more extensive network coverage. Possible use cases may include: providing service continuity for machine-to-machine (M2M) or Internet of Things (IoT) devices or for passengers on board of vehicles, or ensuring service availability for critical communications, and future railway, maritime, or aeronautical communications. Satellite communication may utilize geostationary earth orbit (GEO) satellite systems, but also low earth orbit (LEO) satellite systems, in particular mega-constellations (i.e., systems in which hundreds of (nano) satellites are deployed). A given satellite 106 in the mega-constellation may cover several satellite-enabled network entities that create on-ground cells. The on-ground cells may be created through an on-ground relay access node or by an access node located on-ground or in a satellite.

It is obvious for a person skilled in the art that the access node 104 depicted in FIG. 1 is just an example of a part of a radio access network, and in practice the radio access network may comprise a plurality of access nodes 104, the UEs 100, 102 may have access to a plurality of radio cells, and the radio access network may also comprise other apparatuses, such as physical layer relay access nodes or other entities. At least one of the access nodes may be a Home eNodeB or a Home gNodeB. A Home gNodeB or a Home eNodeB is a type of access node that may be used to provide indoor coverage inside a home, office, or other indoor environment.

Additionally, in a geographical area of a radio access network, a plurality of different kinds of radio cells as well as a plurality of radio cells may be provided. Radio cells may be macro cells (or umbrella cells) which may be large cells having a diameter of up to tens of kilometers, or smaller cells such as micro-, femto- or picocells. The access node(s) 104 of FIG. 1 may provide any kind of these cells. A cellular radio network may be implemented as a multilayer access networks including several kinds of radio cells. In multilayer access networks, one access node may provide one kind of a radio cell or radio cells, and thus a plurality of access nodes may be needed to provide such a multilayer access network.

For fulfilling the need for improving performance of radio access networks, the concept of "plug-and-play" access nodes may be introduced. A radio access network, which may be able to use "plug-and-play" access nodes, may include, in addition to Home eNodeBs or Home gNodeBs, a Home Node B gateway (HNB-GW) (not shown in FIG. 1). An HNB-GW, which may be installed within an operator's radio access network, may aggregate traffic from a large number of Home eNodeBs or Home gNodeBs back to a core network 110 of the operator.

Some example embodiments are described below using principles and terminology of 5G radio access technology without limiting the example embodiments to 5G radio access technology, however.

In energy harvesting technology, a terminal device based on energy harvesting may be operated in active or passive mode. The terminal device itself may use energy harvested from wireless radio waves as well as any other form of energy that may be harvested, and may operate with ultra-low power in a range from tens of microwatts to hundreds of microwatts. For example, if energy is harvested from wireless radio waves, an output power of energy harvester may be from several microwatt to tens of microwatt. If a solar panel is used for energy harvesting from solar/light, the output power may be less than 1 milliwatt due to a small size of the solar panel. An energy harvesting device may harvest energy, and then use an active circuit for transmission in a way similar to a conventional transmitter. Energy harvesting enabled communication services, also referred to as ambient IoT in 3GPP, may be desired in various vertical industries including logistics, manufacture, transportation, energy industry etc. Enabling ambient IoT devices, in both public and private networks, may benefit the whole 5G system. For example, they could facilitate operation under extreme environmental conditions e.g. high pressure, extremely high/low temperature, humid environment etc., vibration, they may enable ultra-low complexity (low cost), very small terminal size/form factor (e.g. a thickness of about 1 mm), and/or maintenance-free and longer life cycle etc., and/or they could be useful in other scenarios where a terminal driven by a battery is not feasible. Support for ambient IoTs using either battery-less terminal or terminal with limited energy storage capability (e.g., using a capacitor) could be beneficial for the existing 3GPP technologies.

RFID solutions may be used with backscattering technology. Ambient IoT might use 3GPP technology to enhance coverage for backscattering RFID solutions, as well as introduce advanced features like harvesting energy from the dedicated RF energy source under network control and/or ambient energy source including RF as well as other energy source which is not under network control, and improving the energy efficiency for IoT-type of data transmissions. The wireless devices may be battery-less devices or devices with limited energy storage capability, and energy may be provided via radio wave harvesting, light, motion etc. One target is passive IoT or ambient energy enabled IoTs with energy harvesting capabilities, with low rate and low complexity. Thus battery-less and devices with small batteries might be supported, as well active and passive IoTs devices. Other aspects to consider include power consumption, complexity, coverage, data rate, and positioning accuracy.

Depending on storage capacity, the ambient IoT devices may be classified into following types:
  Type A device: No energy storage, no independent signal generation/amplification, i.e. backscattering transmission,
  Type B device: Has energy storage, no independent signal generation, i.e. backscattering transmission. Use of stored energy may include amplification for reflected signals,
  Type C device: Has energy storage, has independent signal generation, i.e., active RF components for transmission. Examples of such devices include RFID tags, Bluetooth low energy tags, or other ambient radiation powered ambient internet of things, AIoT, devices.

Type C devices have storage and active transmission capabilities and may be able to provide better coverage than type A device or type B device. Transmission for type C devices may be similar to that of NR UE, so access protocols may still be used with some changes.

Type C device may be referred to as an ambient radiation powered device or tag. The ambient radiation powered device or tag may be powered by both 3GPP and ambient non-3GPP sources. The gNB (and/or the UE such as a smartphone) may be able to provide RF energy to the ambient radiation powered device(s). However, it is not always efficient to use the gNB to provide RF energy to the ambient radiation powered devices due to link budget consideration as RF harvested energy degrades fast with increasing distance between gNB and the ambient radiation powered devices. Furthermore, increasing gNB power to provide energy to the tags may create a lot of interference to 3GPP network UEs and impact their transmissions. For example, some ambient radiation powered devicesmay be close to the gNB and be well served by gNB, while other ambient radiation powered devicemay be at a cell edge and surrounded by NR/type C devices and may be better served by alternate energy sources if coordinated well. Furthermore, accurate harvested energy level of the ambient radiation powered devicesis known only by the ambient radiation powered devices, since they may harvest energy from non-3GPP sources as well. The device may signal its current energy level when requested by the network, but this consumes energy, and hence it is not feasible to frequently ask the ambient radiation powered devices for their energy level reporting. In addition, it may be impossible to distinguish which part of the energy was harvested from the 3GPP source signals and which from non-3GPP sources (including RF). Knowledge of the device energy level may be beneficial both for the ambient radiation powered device to decrease its service outage, as well as for the network to better plan wireless power transfer (WPT) for the ambient radiation powered device, reduce interference and provide better coverage to the device(s).

Thus, it may be desired for the network to obtain tag harvested energy level information from ambient non-3GPP sources using selective device reporting, in order to assist the network to be able to plan RF energy transfer from the 3GPP source (gNB).

Figure 2:
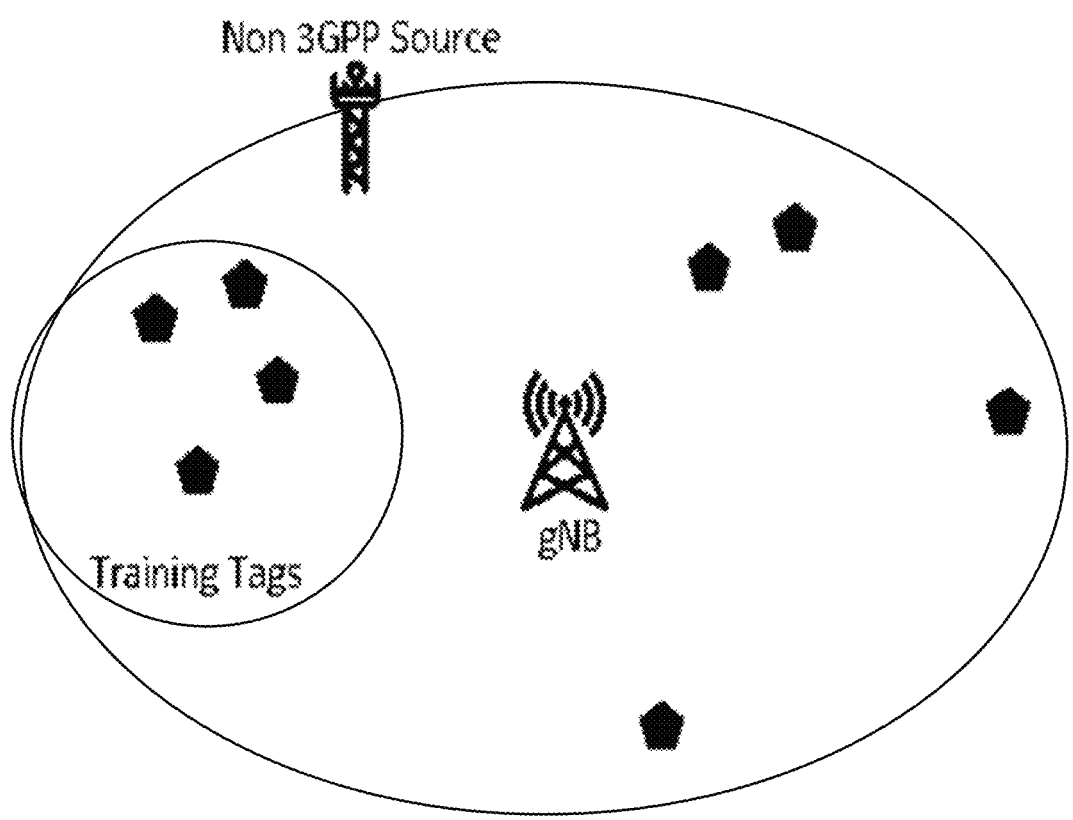
FIG. 2 illustrates an example of selecting tags for energy training.

In an embodiment, energy harvested by an ambient radiation powered device or tag from ambient non-3GPP sources may be estimated. This may be used by the network to plan the WPT from 3GPP sources to the tags. The gNB may select a set of tags and instruct them to suspend normal transmissions during a training period. This may help to estimate collected energy within a time interval more accurately. If a sufficient number of tags in the selected set agrees to send reports within a fixed time period, these tags may start reporting their harvested energy levels with a reporting periodicity configured by the gNB. The gNB may use the energy reports received from the tags to create and iteratively update its energy harvesting model for the tags. The updated energy harvesting model may subsequently be used to plan the WPT from the network side (from the gNB and/or UE). The ambient non-3GPP source may be, for example, a TV (television) tower, WLAN (wireless local area network) signal, and/or a Wi-Fi (wireless fidelity) signal. This is further illustrated in FIG. 2. In FIG. 2, the ambient radiation powered devices or tags are represented by the pentagons.

If RF energy harvesting/WPT from the network is supported by the 3GPP source, the gNB may be considered as a default RF energy source for the tags. The tags may be ambient radiation powered ambient internet of things (AIoT) devices. It may be beneficial for the AIoT devices to harvest energy from any available energy source including ambient non-3GPP RF sources, such as TV towers, WLAN signals, Wi-Fi signals, for instance, to reduce wireless power transfer gNB transmissions. Before starting the WPT, the gNB may evaluate, whether or not it is able to provide the service by using power within certain limits and not cause excessive interference, or by limiting the network overhead. By having an estimate of the harvested energy provided by the non-3GPP ambient sources, the gNB may be able make a better decision on when to initiate the WPT if required, thus saving energy at the network side, while at the same time maintaining the service for the AIoT devices.

Figure 3:
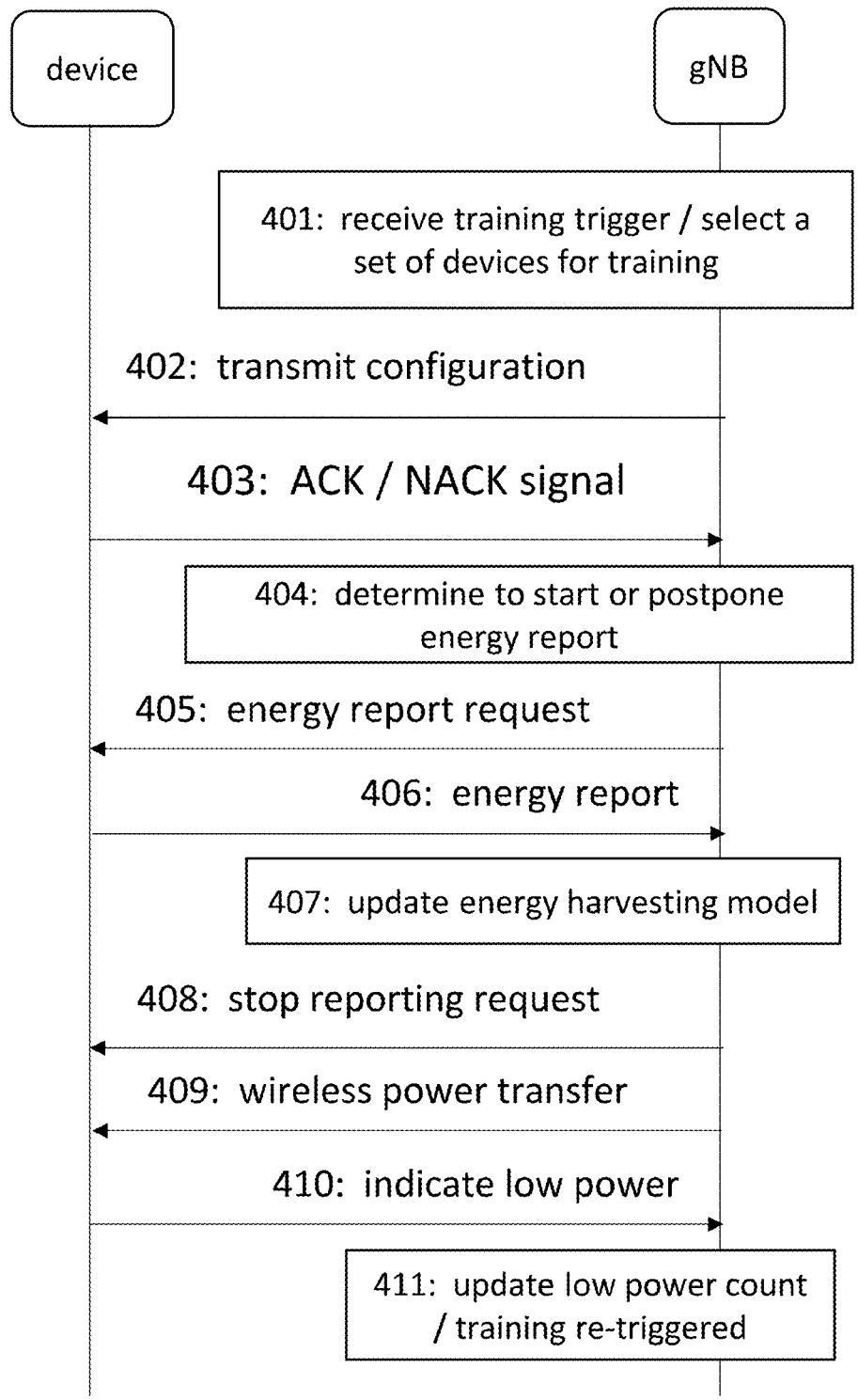
FIGS. 3 to 7 illustrate an exemplary method.

FIG. 3 illustrates a signal flow diagram according to an example embodiment.

Referring to FIG. 3, at 401, a network apparatus, such as the gNB, may receive or detect a training trigger from the network. Further, at 401, the gNB may select a set of ambient radiation powered devices for training. The selecting of the set may be based on various factors, such as the geographical location of the tags, the last reported ambient radiation energy level of the tags, and/or population proportion of the tags. The gNB may suspend scheduling of WPT signals for the gNB and any other 3GPP device (e.g. UE) sending WPT signals. The gNB may thus suspend transmission of radio frequency signals for ambient radiation energy harvesting at the ambient radiation powered devices, and/or the gNB may indicate to other network nodes, such as UE(s), to suspend transmission of radio frequency signals for ambient radiation energy harvesting at the ambient radiation powered devices. This may ensure that the ambient radiation energy harvested at the ambient radiation powered device during a training period is from non-3GPP source(s). At 402, the gNB may transmit a configuration to the ambient radiation powered device(s) in the set, instructing the ambient radiation powered device(s) in the set to suspend transmissions other than harvested ambient radiation energy reporting within a time window $W=\delta+T*N_{TR}$ time slots, and to instruct the ambient radiation powered device(s) in the set to report the harvested ambient radiation energy level at a time interval of every T time slots for $N_{TR}$ instances, where W is a duration of the time window, T is a predefined periodicity of harvested ambient radiation energy reporting, and $N_{TR}$ is a number of harvested ambient radiation energy reports. $\delta \geq 0$ and it may be an example of a time period before the ambient radiation powered device starts harvested energy reporting for the first time. In other words, $\delta$ may be configured within a range between 0 and a pre-defined time value inclusive, and finish any ongoing energy consuming task. Since during the training period, the ambient radiation powered devices do not spend any energy on making transmissions other than harvested ambient radiation energy reporting and the 3GPP sources do not schedule any WPT signals, the harvested ambient radiation energy reporting may facilitate the calculation of harvested ambient radiation energy supplied to the ambient radiation powered devices explicitly from non-3GPP sources. The choice of T and $N_{TR}$ may depend on factors such as the required confidence for the energy model, the size of the selected set of the ambient radiation powered devices, and the tolerable interference for the network.

At 403, the ambient radiation powered device(s) may respond with an indication, such as a positive acknowledgement (ACK) signal, upon the ambient radiation powered device agreeing to the transmission of the harvested ambient energy reports. Thus the gNB may receive, at 404, ACK signal(s) from at least one ambient radiation powered device. Alternatively, the ambient radiation powered device(s) may respond at 403 with another indication, e.g. a negative acknowledgement (NACK) signal, upon the ambient radiation powered device not agreeing to the transmission of the harvested ambient energy reporting, which may be due to reasons such as not having sufficient energy for the reporting and/or having urgent data to transmit. Upon there being an insufficient amount of ACKs, i.e. less than a predefined number, received at 404 by the gNB, the gNB may send a request to postpone 404 energy reporting to a later time, or select another set of ambient radiation powered devices. Upon there being a sufficient amount of ACKs, at least one or at least the predefined number, received at 404 by the gNB, the ambient radiation powered device(s) that sent the ACK(s) may be instructed or requested, at 405, by the gNB to periodically report their harvested ambient radiation energy level according to the configuration. Upon there not being a sufficient amount of received ACKs, i.e. less than the predefined number, the gNB may decide at 404 to delay or postpone the training, or a selection of another set of tags may be carried out by the gNB.

The decision to select another set, or delay or postpone the training, may be based on a configured threshold. Upon a number of tags responding with an ACK>threshold, the gNB may, either immediately or after a delay, notify the tags which responded with an ACK signal to start energy reporting. Thus the reporting may be initiated after a time period $\delta$, wherein $\delta \geq 0$ and it may be an example of a time period before the ambient radiation powered device starts harvested energy reporting for the first time. Otherwise, the gNB may delay or postpone the training, or a selection of another set of tags may be carried out by the gNB.

Upon receiving the request 405, the ambient radiation powered device(s) that responded with an ACK signal may report, at 406, the harvested ambient radiation energy levels periodically according to the configuration to the gNB, i.e. at least one ambient radiation powered device may send harvested ambient radiation energy report to the gNB. At 407, the gNB may receive the energy reporting 406 and utilize the received energy report to update a harvested ambient radiation energy model of the ambient radiation powered devices in the set, or a subset of the ambient radiation powered devices. The harvested ambient radiation energy model may further be augmented with supplementary data such as the time of the energy reporting and the tag identification, so that the gNB may perform more precise prediction of the harvested ambient radiation energy later. At 408, the gNB may send to the ambient radiation powered device(s) a request to stop the harvested ambient radiation energy reporting and resume normal transmission. The ambient radiation powered devices(s) may then resume a normal operating mode, ending the training period or time window W. At 409, gNB may send a WPT signal, i.e. perform wireless power transfer, to the ambient radiation powered device based on the gNB's evaluation on the energy harvested by the ambient radiation powered device from the non-3GPP source(s). Upon the ambient radiation powered devices covered (powered) by the non-3GPP source(s) not having enough energy, the ambient radiation powered devices may report an energy deficiency signal which may be used by the gNB to re-trigger training upon a criterion for the training being met. The gNB may monitor energy status information on a number of ambient radiation powered devices that report an insufficient power level outside the training period. This may be based on the tag(s) indicating/reporting, at 410, insufficient energy/low power. At 411, the gNB may update the insufficient energy/low power tag count. If the amount of ambient radiation powered devices with insufficient energy from the non-3GPP source (s) is greater than a predefined threshold, the training may be re-triggered 411 by the gNB. This may mean that the gNB may re-initiate process to start the training period from 401, upon a number of ambient radiation powered devices in the set that report an insufficient power level outside the training period being greater than a predefined threshold value.

The gNB may decide to perform WPT to the ambient radiation powered device(s) when triggered to do so. The gNB may check the tag energy model and decide, whether to perform WPT or not, based on factors such as an operational energy threshold ETh of the ambient radiation powered device(s) and trend (increasing or decreasing) of the predicted ambient non-3GPP energy levels. The gNB may keep updating the count of the ambient radiation powered devices in the set that report insufficient power, wherein upon the count being greater than the threshold, a re-training trigger may be induced, and the training may be restarted by the gNB.

The training tags may have similar harvesting capabilities and be geographically co-located, so they may harvest similar amounts of energy from the nearby ambient sources. The energy model for the training tags may be maintained by the gNB. This is illustrated below in Table 1 and Table 2. For example, upon the training period or time window being 5 time intervals, there may be ten training samples, and the reporting frequency (periodicity) may be once every five time intervals, wherein it may be noted that the harvested energy across the ambient radiation powered devices is steadily increasing during the training phase from time intervals 1 to 11. Once the training is completed, the gNB may generate a prediction for the harvested ambient energy using methods such as Bayesian estimation or time-series forecasting. A larger training dataset may enable a better prediction. Other additional data may be used to enhance the quality of the energy model, such as time stamps and environmental indicators. In time slot 13, the gNB may receive an estimation trigger, after which the gNB may generate the predicted harvested energy value for the ambient radiation powered devices, as shown in Table 2, Based on the observation that the harvested ambient energy for the ambient radiation powered devices had an increasing trend in the past training window (i.e. training period), as well as the predicted energy being higher than a preset threshold, the gNB may decide to not initiate WPT to the ambient radiation powered devices and defer it for a later time.

TABLE 1

| | Energy Reporting from the Training Tags | | | | |
|---|---|---|---|---|---|
| | Time | Tag 1 | Tag 2 | Tag 3 | Tag 4 |
| Training Window Start T = 5, $N_{TR}$ = 10 | 1 | 0 | 3 | 2 | 4 |
| +2 Non 3GPP Source Harvested | 2 | 2 | 5 | 4 | 6 |
| | 3 | 2 | 5 | 4 | 6 |
| +4 Solar Power Harvested | 4 | 6 | 9 | 8 | 10 |
| −5 Report Energy to gNB | 5 | 1 | 4 | 3 | 5 |
| +5 Non 3GPP Source + Solar Power Harvested | 6 | 6 | 9 | 8 | 10 |
| | 7 | 6 | 9 | 8 | 10 |
| +3 Solar Power Harvested | 8 | 9 | 12 | 11 | 13 |
| +3 Solar Power Harvested | 9 | 9 | 12 | 11 | 13 |
| −5 Report Energy to gNB | 10 | 4 | 7 | 6 | 8 |
| Training Window End | 11 | 4 | 7 | 6 | 8 |

TABLE 2

| | Energy Model at gNB | | | | |
|---|---|---|---|---|---|
| | Time | Tag 1 | Tag 2 | Tag 3 | Tag 4 |
| Training Window Start T = 5, $N_{TR}$ = 10, $E_{Th}$ = 10 | 1 | | | | |
| | 2 | | | | |
| | 3 | | | | |
| | 4 | | | | |
| | 5 | 1 | 4 | 3 | 5 |
| | 6 | | | | |
| | 7 | | | | |
| | 8 | | | | |
| | 9 | | | | |

TABLE 2-continued

| | Energy Model at gNB | | | | |
|---|---|---|---|---|---|
| | Time | Tag 1 | Tag 2 | Tag 3 | Tag 4 |
| Training Window End | 10 | 4 | 7 | 6 | 8 |
| | 11 | | | | |
| | 12 | | | | |
| Estimation Trigger Received | 13 | | | | |
| Predicted Power Level | 14 | 10 | 13 | 12 | 14 |
| | 15 | gNB Action: Defer WPT | | | |

The energy model may be updated as shown in Table 3 below. In that case, the gNB may observe that the harvested ambient energy is not increasing, and the predicted harvested energy is less than the threshold for the ambient radiation powered devices, therefore, the gNB may initiate WPT. The power P may be based on the energy model, i.e., sufficient till the next expected ambient power harvesting, as well as interference conditions of the network.

TABLE 3

| | Energy Model at gNB | | | | |
|---|---|---|---|---|---|
| | Time | Tag 1 | Tag 2 | Tag 3 | Tag 4 |
| Training Window Start T = 5, $N_{TR}$ = 10, $E_{Th}$ = 10 | 1 | | | | |
| | 2 | | | | |
| | 3 | | | | |
| | 4 | | | | |
| | 5 | 1 | 4 | 3 | 5 |
| | 6 | | | | |
| | 7 | | | | |
| | 8 | | | | |
| | 9 | | | | |
| Training Window End | 10 | 1 | 4 | 3 | 5 |
| | 11 | | | | |
| | 12 | | | | |
| Estimation Trigger Received | 13 | | | | |
| Predicted Power Level | 14 | 2 | 5 | 4 | 6 |
| | 15 | gNB Action: Provide WPT to Tags with Power P | | | |

A data-driven approach to plan and optimize the network wireless energy transmission to the ambient radiation powered devices may thus be provided, which may be usable for deployments with slowly varying environment, such as an industrial indoor setting. An improved service for the ambient radiation powered device may be provided, with lower chances of power outage and subsequent failed transmissions for the ambient radiation powered device. The UEs may use information obtained to defer tag wireless power transfer to another UE to achieve the UE's own QoS.

Figure 4:
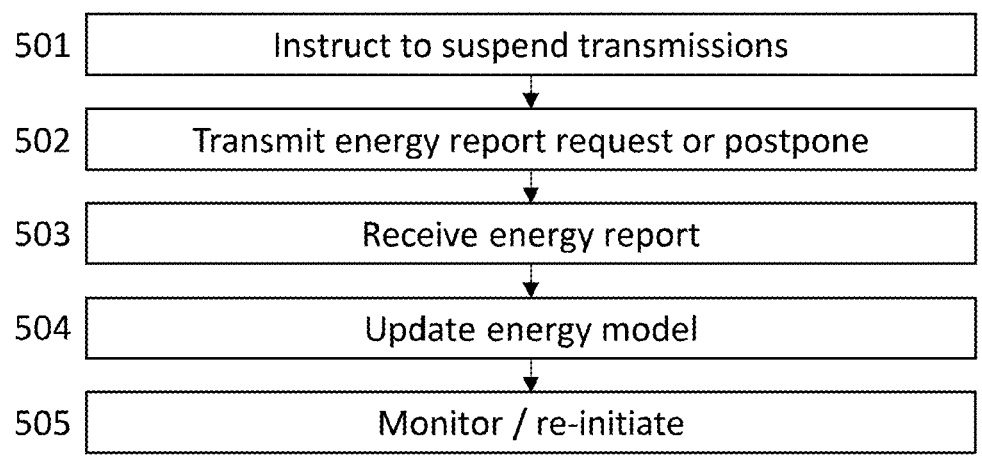
Figure 8:
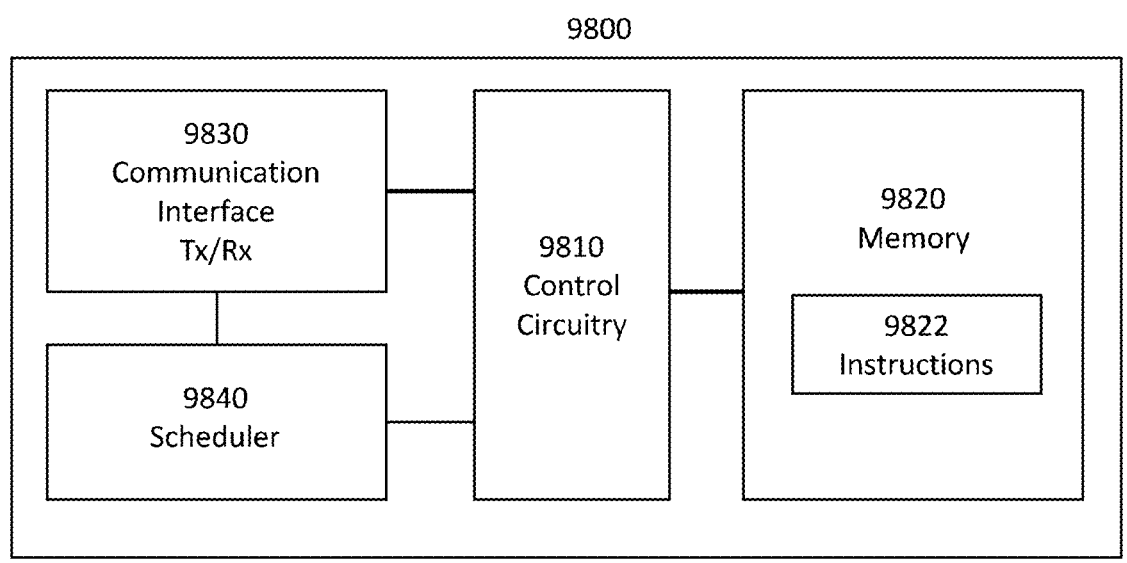
FIGS. 8 to 9 illustrates exemplary apparatuses.

FIG. 4 illustrates a flow chart according to an example embodiment of a method performed by an apparatus 9800 depicted in FIG. 8. For example, the apparatus 9800 may be, or comprise, or be comprised in, a network apparatus 104 such as radio access network node gNB or a distributed unit 105 or a central unit 108.

Referring to FIG. 4, in block 501, the gNB may instruct at 501 a set of ambient radiation powered devices to suspend transmissions other than harvested ambient radiation energy report. Before that the gNB may suspend transmission of radio frequency signals for ambient radiation energy harvesting at the ambient radiation powered devices, and/or indicate to other network nodes, such as UE(s), to suspend transmission of radio frequency signals for ambient radiation energy harvesting at the ambient radiation powered devices. Upon at least a predefined number of the ambient radiation powered devices in the set agreeing to transmit the harvested ambient radiation energy report with a predefined reporting periodicity configured by the gNB, the gNB may at 502 request the at least predefined number of the ambient radiation powered devices agreeing to periodically transmit the harvested ambient radiation energy report, to transmit the harvested ambient radiation energy report with the predefined reporting periodicity. Upon the at least predefined number of the ambient radiation powered devices in the set agreeing to transmit the harvested ambient radiation energy report with the predefined reporting periodicity configured by the gNB, the gNB may, at 503, receive the harvested ambient radiation energy report from at least one ambient radiation powered device in the set with the predefined reporting periodicity configured by the gNB. At 504, the gNB may utilize the received harvested ambient radiation energy report to update a harvested ambient radiation energy model of the ambient radiation powered devices in the set, or a subset of the ambient radiation powered devices. At 505, the gNB may monitor energy status information on a number of ambient radiation powered devices that report an insufficient power level outside the training period, and/or re-initiate the training period, upon a number of ambient radiation powered devices in the set that report an insufficient power level outside the training period being greater than a predefined threshold value.

Upon a number of ambient radiation powered devices agreeing to transmit the harvested ambient radiation energy report during the training period being lower than the predefined number, the gNB may, at 502, request the ambient radiation powered devices in the set to postpone the harvested ambient radiation energy report.

Figure 5:
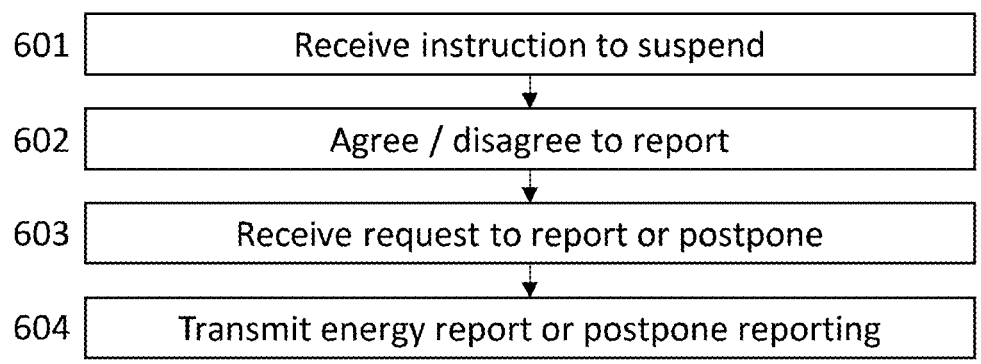
Figure 9:
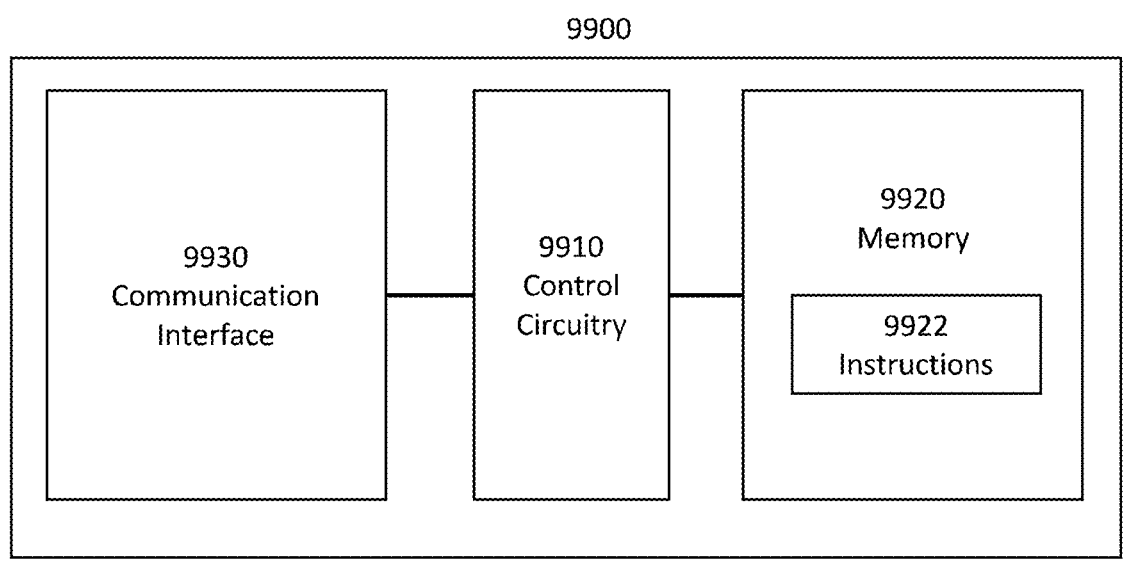

FIG. 5 illustrates a flow chart according to an example embodiment of a method performed by a device 9900 depicted in FIG. 9. For example, the device 9900 may be, or comprise, or be comprised in, an RFID tag, Bluetooth low energy tag, or other ambient radiation powered AIoT device.

Referring to FIG. 5, in block 601, the device 9900 may receive from a network apparatus, such as a gNB, a transmission instructing the device to suspend transmissions other than harvested ambient radiation energy report. At 602, the device may agree or disagree to transmit, to the network apparatus, the harvested ambient radiation energy report with a predefined reporting periodicity configured by the network apparatus. The device may disagree to transmit, to the network apparatus, the harvested ambient radiation energy report, upon not having sufficient energy for the harvested ambient radiation energy report, and/or upon having urgent data transmission requirements. At 603, the device may receive from the network apparatus, a request to transmit, to the network apparatus, the harvested ambient radiation energy reporting. Upon the device agreeing to transmit the harvested ambient radiation energy report, the device may at 604, transmit, to the network apparatus, the harvested ambient radiation energy report periodically with the predefined reporting periodicity.

Alternatively at 603, the device may receive from the network apparatus, a request to postpone the harvested ambient radiation energy reporting, wherein the device may postpone 604 the harvested ambient radiation energy reporting.

Figure 6:
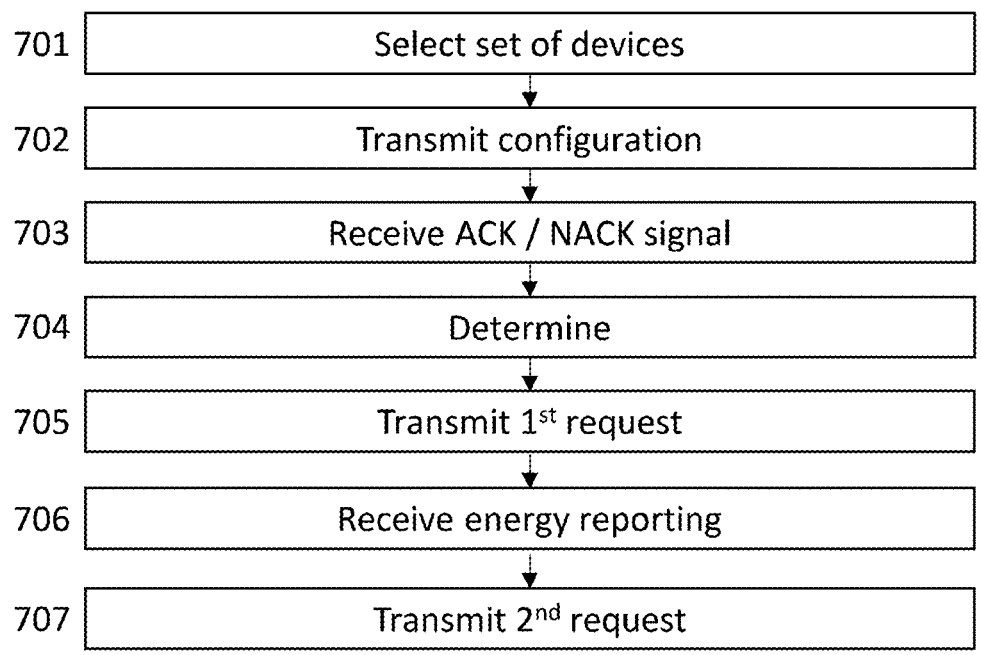

FIG. 6 illustrates a flow chart according to an example embodiment of a method performed by an apparatus 9800 depicted in FIG. 8. For example, the apparatus 9800 may be, or comprise, or be comprised in, a network apparatus 104 such as radio access network node gNB or a distributed unit 105 or a central unit 108.

Referring to FIG. 6, the apparatus may, in block 701, select a set of ambient radiation powered ambient internet of things, AIoT, devices from a plurality of ambient radiation powered AIoT devices in a network. The selecting the set of ambient radiation powered AIoT devices from the plurality of ambient radiation powered AIoT devices in the network is based on one or more of a geographical location of the plurality of ambient radiation powered AIoT devices, last reported energy level of the plurality of ambient radiation powered AIoT devices, or population proportion of the plurality of ambient radiation powered AIoT devices. The apparatus may, in block 702, send, to at least one ambient radiation powered AIoT device of the set, a configuration instructing the at least one ambient radiation powered AIoT device to suspend transmissions other than harvested ambient radiation energy reporting within a time window, and to report harvested ambient radiation energy at a time interval. The apparatus may, in block 703, receive, from the at least one ambient radiation powered AIoT device of the set, at least one indication indicating whether the at least one ambient radiation powered AIoT device agrees or disagrees to suspend the transmissions other than the harvested ambient radiation energy reporting. The apparatus may, in block 704, determine whether the number of the ambient radiation powered AIoT devices agreeing to suspend transmissions other than the harvested ambient radiation energy reporting exceeds a predefined number or not, based on the at least one indication.

The apparatus may, in block 705, in response to the determination that the number of the ambient radiation powered AIoT devices agreeing to suspend transmissions other than the harvested ambient radiation energy reporting exceeding the predefined number, wait for a period of time, and send a first request to the at least one ambient radiation powered AIoT device agreeing to suspend transmission other than the harvested energy reporting to start harvested ambient radiation energy reporting. The period of time may be from 0 to a predefined time value. The apparatus may, in block 706, receive the harvested ambient radiation energy reporting from the at least one ambient radiation powered AIoT device, and start training based on the received harvested ambient radiation energy reporting. The apparatus may, in block 707, transmit a second request to the at least one ambient radiation powered AIoT device to stop the harvested ambient radiation energy reporting.

Alternatively, in response to the determination that the number of the ambient radiation powered AIoT devices agreeing to suspend transmissions other than the harvested ambient radiation energy reporting not exceeding the predefined number, the apparatus may re-transmit, after a pause, to the at least one ambient radiation powered AIoT device of the set, the configuration, or select another set of ambient radiation powered AIoT devices from the plurality of ambient radiation powered AIoT devices in the network.

Figure 7:
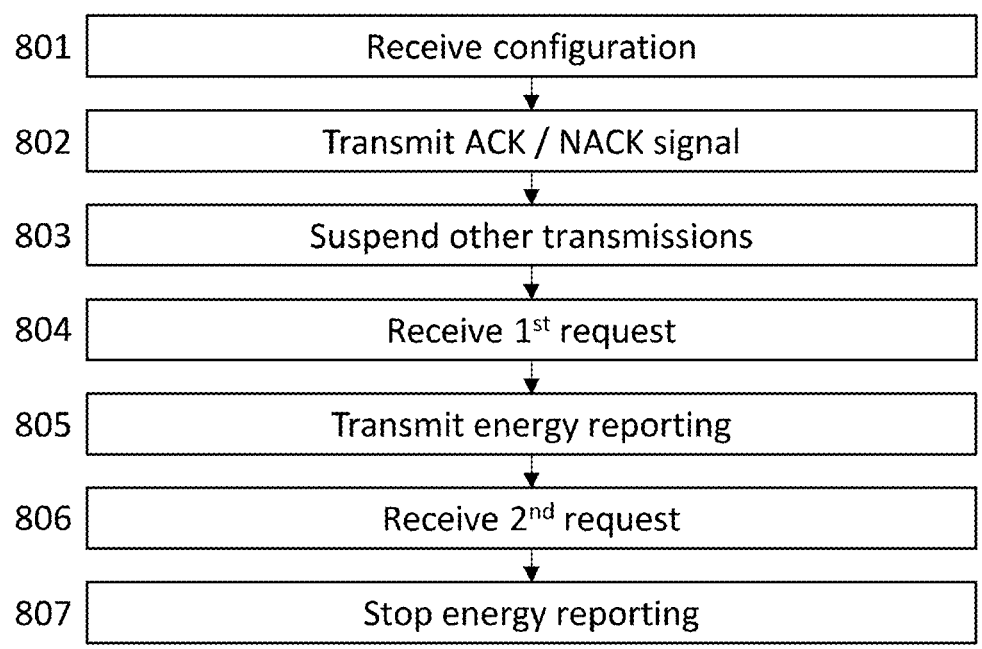

FIG. 7 illustrates a flow chart according to an example embodiment of a method performed by an apparatus 9900 depicted in FIG. 9. For example, the apparatus 9900 may be, or comprise, or be comprised in, an RFID tag, Bluetooth low energy tag, or other ambient radiation powered AIoT device.

Referring to FIG. 7, the device may, in block 801, receive, from a network apparatus such as a gNB, a configuration instructing the device to suspend transmissions other than harvested ambient radiation energy reporting within a time window, and to report harvested ambient radiation energy of the device at a time interval. The device may, in block 802 send, to the network apparatus, an indication indicating whether the device agrees or disagrees to suspend transmissions other than the harvested ambient radiation energy reporting. In response to agreeing to suspend the transmissions other than the harvested ambient radiation energy reporting, the device may, in block 803, suspend the transmissions other than harvested ambient radiation energy reporting, wherein the indication 802 may comprise an ACK signal. The device may, in block 804, receive, from the network apparatus, a first request to start the harvested ambient radiation energy reporting; and start harvested ambient radiation energy reporting 805 upon receiving the first request. The device may, in block 806, receive, from the network apparatus, a second request indicating the device to stop the harvested ambient radiation energy reporting, and stop 807 the harvested ambient radiation energy reporting upon receiving the second request.

In response to disagreeing to suspend the transmissions other than the harvested ambient radiation energy reporting, the indication 802 may comprise a NACK signal, wherein disagreeing to suspend the transmissions other than the harvested ambient radiation energy reporting may be determined based on at least one of the following: the device not having sufficient energy for the harvested ambient radiation energy reporting, or the device having urgent data transmission requirements.

The blocks, related functions, and information exchanges (messages) described above by means of FIGS. 2-7 are in no absolute chronological order, and some of them may be performed simultaneously or in an order differing from the described one. Other functions can also be executed between them or within them, and other information may be sent, and/or other rules applied. Some of the blocks or part of the blocks or one or more pieces of information can also be left out or replaced by a corresponding block or part of the block or one or more pieces of information.

In an embodiment, the apparatus may suspend transmission of radio frequency signals for ambient radiation energy harvesting at the ambient radiation powered devices, and/or indicate to network nodes to suspend transmission of radio frequency signals for ambient radiation energy harvesting at the ambient radiation powered devices.

In an embodiment, the apparatus may use the received harvested ambient radiation energy report to update a harvested ambient radiation energy model of the ambient radiation powered devices in the set, or a subset of the ambient radiation powered devices.

In an embodiment, the apparatus may request the at least predefined number of the ambient radiation powered devices agreeing to periodically transmit the harvested ambient radiation energy report, to transmit the harvested ambient radiation energy report during the training period with the predefined reporting periodicity.

In an embodiment, upon a number of ambient radiation powered devices agreeing to transmit the harvested ambient radiation energy report during the training period being lower than the predefined number, the apparatus may request the ambient radiation powered devices in the set to postpone the harvested ambient radiation energy report.

In an embodiment, the apparatus may monitor energy status information on a number of ambient radiation powered devices that report an insufficient power level outside the training period.

In an embodiment, the apparatus may re-initiate the training period, upon a number of ambient radiation powered devices in the set that report an insufficient power level outside the training period being greater than a predefined threshold value.

In an embodiment, the ambient radiation powered device may transmit, to the network apparatus, the harvested ambient radiation energy report periodically during the training period with the predefined reporting periodicity.

In an embodiment, the ambient radiation powered device may disagree to transmit, to the network apparatus, the harvested ambient radiation energy report, upon not having sufficient energy for the harvested ambient radiation energy report, and/or upon having urgent data transmission requirements.

In an embodiment, in response to the determination that the number of the ambient radiation powered AIoT devices agreeing to suspend transmissions other than the harvested ambient radiation energy reporting exceeding the predefined number, the apparatus gNB may wait for a period of time, and send a first request to the at least one ambient radiation powered AIoT device agreeing to suspend transmission other than the harvested energy reporting to start harvested ambient radiation energy reporting. The period of time may be within a range between 0 and a predefined time value inclusive.

In an embodiment, the apparatus may receive the harvested ambient radiation energy reporting from the at least one ambient radiation powered AIoT device, and start training based on the received harvested ambient radiation energy reporting.

In an embodiment, the apparatus may transmit a second request to the at least one ambient radiation powered AIoT device to stop the harvested ambient radiation energy reporting.

In an embodiment, the apparatus may, in response to the determination that the number of the ambient radiation powered AIoT devices agreeing to suspend transmissions other than the harvested ambient radiation energy reporting not exceeding the predefined number, re-transmit, after a pause, to the at least one ambient radiation powered AIoT device of the set, the configuration, or select another set of ambient radiation powered AIoT devices from the plurality of ambient radiation powered AIoT devices in the network.

In an embodiment, the selecting the set of ambient radiation powered AIoT devices from the plurality of ambient radiation powered AIoT devices in the network may be based on one or more of a geographical location of the plurality of ambient radiation powered AIoT devices, last reported energy level of the plurality of ambient radiation powered AIoT devices, or population proportion of the plurality of ambient radiation powered AIoT devices.

In an embodiment, the ambient radiation powered device may, in response to agreeing to suspend the transmissions other than the harvested ambient radiation energy reporting, suspend the transmissions other than harvested ambient radiation energy reporting, wherein the indication comprises an ACK signal.

In an embodiment, the ambient radiation powered device may receive, from the network apparatus, a first request to start the harvested ambient radiation energy reporting; and start harvested ambient radiation energy reporting upon receiving the first request.

In an embodiment, the ambient radiation powered device may receive, from the network apparatus, a second request indicating the device to stop the harvested ambient radiation energy reporting, and stop the harvested ambient radiation energy reporting upon receiving the second request.

In an embodiment, wherein in response to disagreeing to suspend the transmissions other than the harvested ambient radiation energy reporting, the indication may comprise a NACK signal, wherein disagreeing to suspend the transmissions other than the harvested ambient radiation energy reporting may be determined based on at least one of the following: the device not having sufficient energy for the harvested ambient radiation energy reporting, or the device having urgent data transmission requirements.

In an embodiment, there is provided a computer program comprising instructions which, when executed by a device, cause the device to perform at least the following: receive, from a network apparatus, a configuration instructing the device to suspend transmissions other than harvested ambient radiation energy reporting within a time window, and to report harvested ambient radiation energy of the device at a time interval; and send, to the network apparatus, an indication indicating whether the device agrees or disagrees to suspend transmissions other than the harvested ambient radiation energy reporting.

In an embodiment, there is provided a computer readable medium comprising program instructions which, when executed by a device, cause the apparatus to perform at least the following: receive, from a network apparatus, a configuration instructing the device to suspend transmissions other than harvested ambient radiation energy reporting within a time window, and to report harvested ambient radiation energy of the device at a time interval; and send, to the network apparatus, an indication indicating whether the device agrees or disagrees to suspend transmissions other than the harvested ambient radiation energy reporting.

In an embodiment, there is provided a non-transitory computer readable medium comprising program instructions which, when executed by a device, cause the device to perform at least the following: receive, from a network apparatus, a configuration instructing the device to suspend transmissions other than harvested ambient radiation energy reporting within a time window, and to report harvested ambient radiation energy of the device at a time interval; and send, to the network apparatus, an indication indicating whether the device agrees or disagrees to suspend transmissions other than the harvested ambient radiation energy reporting.

As used herein, "at least one of the following: <a list of two or more elements>" and "at least one of <a list of two or more elements>" and similar wording, where the list of two or more elements are joined by "and" or "or", mean at least any one of the elements, or at least any two or more of the elements, or at least all the elements.

FIG. 8 illustrates an example of an apparatus 9800 comprising means for performing one or more of the example embodiments described above. For example, the apparatus 9800 may be, or comprise, or be comprised in, a radio access network node 104 or a distributed unit 105 or a central unit 108.

The apparatus 9800 may comprise, for example, a circuitry or a chipset applicable for realizing one or more of the example embodiments described above. The apparatus 9800 may be an electronic device comprising one or more electronic circuitries. The apparatus 9800 may comprise a communication control circuitry 9810 such as at least one processor, and at least one memory 9820 storing instructions 9822 which, when executed by the at least one processor, cause the apparatus 9800 to carry out one or more of the example embodiments described above. Such instructions 9822 may, for example, include computer program code (software). The at least one processor and the at least one memory storing the instructions may provide the means for providing or causing the performance of any of the methods and/or blocks described above.

The processor is coupled to the memory 9820. The processor is configured to read and write data to and from the memory 9820. The memory 9820 may comprise one or more memory units. The memory units may be volatile or non-volatile. It is to be noted that there may be one or more units of non-volatile memory and one or more units of volatile memory or, alternatively, one or more units of non-volatile memory, or, alternatively, one or more units of volatile memory. Volatile memory may be for example random-access memory (RAM), dynamic random-access memory (DRAM) or synchronous dynamic random-access memory (SDRAM). Non-volatile memory may be for example read-only memory (ROM), programmable read-only memory (PROM), electronically erasable programmable read-only memory (EEPROM), flash memory, optical storage or magnetic storage. In general, memories may be referred to as non-transitory computer readable media. The term "non-transitory," as used herein, is a limitation of the medium itself (i.e., tangible, not a signal) as opposed to a limitation on data storage persistency (e.g., RAM vs. ROM). The memory 9820 stores computer readable instructions that are executed by the processor. For example, non-volatile memory stores the computer readable instructions, and the processor executes the instructions using volatile memory for temporary storage of data and/or instructions.

The computer readable instructions may have been pre-stored to the memory 9820 or, alternatively or additionally, they may be received, by the apparatus, via an electromagnetic carrier signal and/or may be copied from a physical entity such as a computer program product. Execution of the computer readable instructions causes the apparatus 9800 to perform one or more of the functionalities described above.

The memory 9820 may be implemented using any suitable data storage technology, such as semiconductor-based memory devices, flash memory, magnetic memory devices and systems, optical memory devices and systems, fixed memory and/or removable memory. The memory may comprise a configuration database for storing configuration data.

The apparatus 9800 may further comprise or be connected to a communication interface 9830, such as a radio unit, comprising hardware and/or software for realizing communication connectivity with one or more wireless communication devices according to one or more communication protocols. The communication interface 9830 comprises at least one transmitter (Tx) and at least one receiver (Rx) that may be integrated to the apparatus 9800 or that the apparatus 9800 may be connected to. The communication interface 9830 may provide means for performing some of the blocks for one or more example embodiments described above. The communication interface 9830 may comprise one or more components, such as: power amplifier, digital front end (DFE), analog-to-digital converter (ADC), digital-to-analog converter (DAC), frequency converter, (de) modulator, and/or encoder/decoder circuitries, controlled by the corresponding controlling units.

The communication interface 9830 provides the apparatus with radio communication capabilities to communicate in the wireless communication network. The communication interface may, for example, provide a radio interface to one or more UEs 100, 102. The apparatus 9800 may further comprise or be connected to another interface towards a core network 110, such as the network coordinator apparatus or AMF 111, and/or to the access nodes 104 of the wireless communication network.

The apparatus 9800 may further comprise a scheduler 9840 that is configured to allocate radio resources. The scheduler 9840 may be configured along with the communication control circuitry 9810 or it may be separately configured.

It is to be noted that the apparatus 9800 may further comprise various components not illustrated in FIG. 8. The various components may be hardware components and/or software components.

FIG. 9 illustrates an example of an apparatus 9900 or device 9900 of a communications network 110, the apparatus 9900 comprising means for performing one or more of the example embodiments described above. For example, the means may be an RFID tag, Bluetooth low energy tag, or other ambient radiation powered ambient internet of things, AIoT, device.

The apparatus 9900 may comprise, for example, a circuitry or a chipset applicable for realizing one or more of the example embodiments described above. The apparatus 9900 may be an electronic device or computing system comprising one or more electronic circuitries. The apparatus 9900 may comprise a control circuitry 9910 such as at least one processor, and at least one memory 9920 storing instructions 9922 which, when executed by the at least one processor, cause the apparatus 9900 to carry out one or more of the example embodiments described above. Such instructions 9922 may, for example, include computer program code (software). The at least one processor and the at least one memory storing the instructions may provide the means for providing or causing the performance of any of the methods and/or blocks described above.

The processor is coupled to the memory 9920. The processor is configured to read and write data to and from the memory 9920. The memory 9920 may comprise one or more memory units. The memory units may be volatile or non-volatile. It is to be noted that there may be one or more units of non-volatile memory and one or more units of volatile memory or, alternatively, one or more units of non-volatile memory, or, alternatively, one or more units of volatile memory. Volatile memory may be for example random-access memory (RAM), dynamic random-access memory (DRAM) or synchronous dynamic random-access memory (SDRAM). Non-volatile memory may be for example read-only memory (ROM), programmable read-only memory (PROM), electronically erasable programmable read-only memory (EEPROM), flash memory, optical storage or magnetic storage. In general, memories may be referred to as non-transitory computer readable media. The term "non-transitory," as used herein, is a limitation of the medium itself (i.e., tangible, not a signal) as opposed to a limitation on data storage persistency (e.g., RAM vs. ROM). The memory 9920 stores computer readable instructions that are executed by the processor. For example, non-volatile memory stores the computer readable instructions, and the processor executes the instructions using volatile memory for temporary storage of data and/or instructions.

The computer readable instructions may have been pre-stored to the memory 9920 or, alternatively or additionally, they may be received, by the apparatus, via an electromagnetic carrier signal and/or may be copied from a physical entity such as a computer program product. Execution of the computer readable instructions causes the apparatus 9900 to perform one or more of the functionalities described above.

The memory 9920 may be implemented using any suitable data storage technology, such as semiconductor-based memory devices, flash memory, magnetic memory devices and systems, optical memory devices and systems, fixed memory and/or removable memory.

The apparatus 9900 may further comprise or be connected to a communication interface 9930 comprising hardware and/or software for realizing communication connectivity according to one or more communication protocols. The communication interface 9930 may comprise at least one transmitter (Tx) and at least one receiver (Rx) that may be integrated to the apparatus 9900 or that the apparatus 9900 may be connected to. The communication interface 9930 may provide means for performing some of the blocks for one or more example embodiments described above. The communication interface 9930 may comprise one or more components, such as: power amplifier, digital front end (DFE), analog-to-digital converter (ADC), digital-to-analog converter (DAC), frequency converter, (de) modulator, and/or encoder/decoder circuitries, controlled by the corresponding controlling units.

The communication interface 9930 provides the apparatus with communication capabilities to communicate in the wireless communication network. The communication interface 9930 may, for example, provide a radio, cable or fiber interface to one or more network nodes 104 of a radio access network.

It is to be noted that the apparatus 9900 may further comprise various components not illustrated in FIG. 9. The various components may be hardware components and/or software components.

As used in this application, the term "circuitry" may refer to one or more or all of the following: a) hardware-only circuit implementations (such as implementations in only analog and/or digital circuitry); and b) combinations of hardware circuits and software, such as (as applicable): i) a combination of analog and/or digital hardware circuit(s) with software/firmware and ii) any portions of hardware processor(s) with software (including digital signal processor(s), software, and memory (ies) that work together to cause an apparatus, such as a mobile phone, to perform various functions); and c) hardware circuit(s) and/or processor(s), such as a microprocessor(s) or a portion of a microprocessor(s), that requires software (for example firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

The techniques and methods described herein may be implemented by various means. For example, these techniques may be implemented in hardware (one or more devices), firmware (one or more devices), software (one or more modules), or combinations thereof. For a hardware implementation, the apparatus(es) of example embodiments may be implemented within one or more application-specific integrated circuits (ASICs), digital signal processors (DSPs), digital signal processing devices (DSPDs), programmable logic devices (PLDs), field programmable gate arrays (FPGAs), graphics processing units (GPUs), processors, controllers, micro-controllers, microprocessors, other electronic units designed to perform the functions described herein, or a combination thereof. For firmware or software, the implementation can be carried out through modules of at least one chipset (for example procedures, functions, and so on) that perform the functions described herein. The software codes may be stored in a memory unit and executed by processors. The memory unit may be implemented within the processor or externally to the processor. In the latter case, it can be communicatively coupled to the processor via various means, as is known in the art. Additionally, the components of the systems described herein may be rearranged and/or complemented by additional components in order to facilitate the achievements of the various aspects, etc., described with regard thereto, and they are not limited to the precise configurations set forth in the given figures, as will be appreciated by one skilled in the art.

It will be obvious to a person skilled in the art that, as technology advances, the inventive concept may be implemented in various ways within the scope of the claims. The embodiments are not limited to the example embodiments described above, but may vary within the scope of the claims. Therefore, all words and expressions should be interpreted broadly, and they are intended to illustrate, not to restrict, the embodiments.

The invention claimed is:

1. An apparatus comprising at least one processor, and at least one memory storing instructions that, when executed by the at least one processor, cause the apparatus at least to:
   initiate a training period by instructing a set of ambient radiation powered devices to suspend transmissions other than harvested ambient radiation energy report during the training period;
   upon at least a predefined number of the ambient radiation powered devices in the set agreeing to transmit the harvested ambient radiation energy report during the training period with a predefined reporting periodicity configured by the apparatus, receive the harvested ambient radiation energy report from at least one ambient radiation powered device in the set with the predefined reporting periodicity configured by the apparatus; and
   generate a predicted harvested ambient energy value for the ambient radiation powered devices.

2. The apparatus according to claim 1, being caused to, suspend transmission of radio frequency signals for ambient radiation energy harvesting at the ambient radiation powered devices.

3. The apparatus according to claim 1, being caused to, indicate to network nodes to suspend transmission of radio frequency signals for ambient radiation energy harvesting at the ambient radiation powered devices.

4. The apparatus according to claim 1, being caused to, use the received harvested ambient radiation energy report to update a harvested ambient radiation energy model of the ambient radiation powered devices in the set, or a subset of the ambient radiation powered devices.

5. The apparatus according to claim 1, being caused to, request the at least predefined number of the ambient radiation powered devices agreeing to periodically transmit the harvested ambient radiation energy report, to transmit the harvested ambient radiation energy report during the training period with the predefined reporting periodicity.

6. The apparatus according to claim 1,
   wherein upon a number of ambient radiation powered devices agreeing to transmit the harvested ambient radiation energy report during the training period being lower than the predefined number,
   the apparatus is caused to request the ambient radiation powered devices in the set to postpone the harvested ambient radiation energy report.

7. The apparatus according to claim 1, further being caused to:
   monitor energy status information on a number of ambient radiation powered devices that report an insufficient power level outside the training period.

8. The apparatus according to claim 1, further being caused to:
   re-initiate the training period, upon a number of ambient radiation powered devices in the set that report an insufficient power level outside the training period being greater than a predefined threshold value.

9. The apparatus according to claim 1, wherein it comprises or is comprised in a gNB.

10. The apparatus according to claim 1, wherein the ambient radiation powered devices are selected from at least one of RFID tags, Bluetooth low energy tags, or other ambient radiation powered ambient internet of things, AIoT, devices.

11. A method comprising:
    initiating, by a network apparatus, a training period by instructing a set of ambient radiation powered devices to suspend transmissions other than harvested ambient radiation energy report during the training period;
    upon at least a predefined number of the ambient radiation powered devices in the set agreeing to transmit the harvested ambient radiation energy report during the training period with a predefined reporting periodicity configured by the apparatus, receive, by the network apparatus, the harvested ambient radiation energy report from at least one ambient radiation powered device in the set with the predefined reporting periodicity configured by the apparatus; and
    generating, by the network apparatus, a predicted harvested ambient energy value for the ambient radiation powered devices.

12. A non-transitory computer readable medium comprising program instructions which, when executed by an apparatus, cause the apparatus to perform at least the following:
    initiate a training period by instructing a set of ambient radiation powered devices to suspend transmissions other than harvested ambient radiation energy report during the training period;
    upon at least a predefined number of the ambient radiation powered devices in the set agreeing to transmit the harvested ambient radiation energy report during the training period with a predefined reporting periodicity configured by the apparatus, receive the harvested ambient radiation energy report from at least one ambient radiation powered device in the set with the predefined reporting periodicity configured by the apparatus; and
    generate a predicted harvested ambient energy value for the ambient radiation powered devices.

* * * * *